3,134,786
5,11-DILOWERALKYLINDOLO[3,2-b]CARBAZOLE-
6,12(5H,11H)-DIONE
Jacob Szmuszkovicz, Kalamazoo, Mich., assignor to The
Upjohn Company, Kalamazoo, Mich., a corporation of
Delaware
No Drawing. Filed Mar. 15, 1963, Ser. No. 265,350
6 Claims. (Cl. 260—315)

This invention pertains to novel indolo[3,2-b]carbazole compounds and to a novel process. More particularly, the invention pertains to novel 5,11-dialkylinodolo[3,2-b]-carbazole-6,12(5H,11H)-diones and to a novel process for preparing the same from 1-alkyl-2-indolecarbonyl halides.

The 5,11-dialkylindolo[3,2-b]carbazole-6,12(5H,11H)-diones of the present invention have the formula:

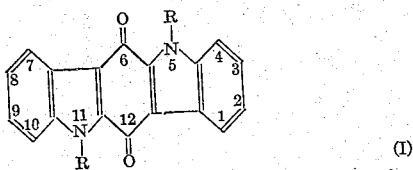

wherein R represents alkyl of 1 to 4 carbon atoms, inclusive. Examples of alkyl of 1 to 4 carbon atoms, inclusive, are methyl, ethyl, propyl, and butyl, and isomeric forms thereof.

The starting materials for preparing the compounds of Formula I are 1-alkyl-2-indolecarbonyl halides having the formula:

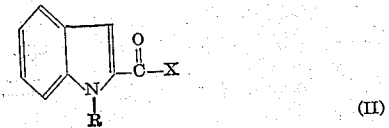

wherein R is as given above and X represents halogen having an atomic number from 17 to 35, i.e., X is chlorine or bromine, preferably chlorine.

The compounds of Formula I are prepared by the intermolecular cyclization of two molecular equivalents of 1-alkyl-2-indolecarbonyl halide of Formula II to produce two molecular equivalents of hydrogen halide and one molecular equivalent of the desired 5,11-dialkylindolo-[3,2-b]carbazole-6,12(5H,11H)-dione. The reaction is carried out by mixing a 1-alkyl-2-indolecarbonyl halide and a Friedel-Crafts catalyst in the presence of an inert solvent while maintaining the mixture at a suitable reaction temperature until the desired reaction has occurred. Examples of inert solvents are ethylene dichloride, 1,1,2,2-tetrachloroethane, carbon disulfide, nitrobenzene, and the like. Examples of Friedel-Crafts catalysts are aluminum chloride, aluminum bromide, boron trifluoride, and the like, aluminum chloride being preferred. The molar ratio of 1-alkyl-2-indolecarbonyl halide to catalyst, although not highly critical, advantageously ranges from about 1:1 to about 1:4, and preferably ranges from about 1:1.5 to about 1:2.5. The reaction can be carried out at temperatures ranging from about 0° C. to about 35° C., or even somewhat higher or lower. Preferably the reaction is carried out between about 15° C. and about 30° C. The time required for completing the reaction is dependent on various factors, such as the reaction temperature, the particular Friedel-Crafts catalyst and/or 1-alkyl-2-indolecarbonyl halide, etc. In general, however, the time required for completing the reaction seldom exceeds about 6 hours, and frequently is much less, such as about 0.5 hour. Upon completion of the reaction, the 5,11 - dialkylindolo[3,2-b]carbazole - 6,12(5H,11H) - dione product can be isolated and purified by conventional means, such as by adding aqueous acid (e.g., hydrochloric acid) to the reaction mixture, recovering the product by filtration, and recrystallizing it.

The starting 1-alkyl-2-indolecarbonyl halides of Formula II are prepared from the corresponding 1-alkyl-2-indolecarboxylic acids having the formula:

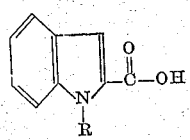

wherein R is as given above, using procedures commonly employed for converting carboxylic acids to acid halides, e.g., by treatment of an acid of Formula III with a phosphorus chloride or bromide. The procedure of Johnson et al., J. Am. Chem. Soc. 67, 423, 1945, which involves the use of phosphorus pentachloride in an ethereal medium is particularly satisfactory.

The 1-alkyl-2-indolecarboxylic acids of Formula III can be prepared by known procedures, e.g., by the procedure of Snyder et al., J. Am. Chem. Soc. 78, 969, 1956, which involves reacting pyruvic acid with a 1-alkyl-1-phenylhydrazine of the formula $C_6H_5$—NR—$NH_2$, wherein R is as given above, to obtain the hydrazone, and cyclizing the latter in the presence of an acid medium.

The 1-alkyl-1-phenylhydrazines are well known and can be prepared in various ways. See Fischer, Ann. 190, 152, 1878; Fierz-David et al., Helv. Chim. Acta 29, 1765, 1946; Audrieth et al., J. Org. Chem. 6, 417, 1941.

The novel 5,11 - dialkylindolo[3,2-b]carbazole - 6,12-(5H,11H)-diones of the invention have central nervous system depressant activity, and can be used for effecting sedation and tranquilization in birds and animals, including humans.

In addition, the novel 5,11-dialkylindolo[3,2-b]carbazole-6,12(5H,11H)-diones of the present invention exhibit high absorption of radiation in the wavelength range of 280–300 millimicrons and accordingly can be employed as effective sun screens when incorporated in suitable vehicles such as transparent film-forming compositions and oils.

The following examples are illustrative of the process and products of the present invention but are not to be construed as limiting.

EXAMPLE 1

*5,11-Dimethylindolo[3,2-b]Carbazole-
6,12(5H,11H)-Dione*

Aluminum chloride (4.0 g.; 0.03 mole) was added during 5 min. to a stirred solution of 1-methyl-2-indolecarbonyl chloride (2.9 g.; 0.015 mole) in 20 ml. of ethylene dichloride. The resulting dark solution was stirred at about 25° C. for 30 min. Ice (10.0 g.) was added, followed by dilute hydrochloric acid (6 ml. of concentrated hydrochloric acid and 32 ml. of water). The mixture was stirred for 1 hr., and the filter cake was washed with water and dried. There was thus obtained 1.0 g. (42 percent yield) of 5,11-dimethylindolo[3,2-b]carbazole-6,12(5H,11H)-dione as a red solid having a melting point of 365° C. Recrystallization from dimethylformamide afforded red needles having the same melting point.

*Analysis.*—Calcd. for $C_{20}H_{14}N_2O_2$: C, 76.42; H, 4.49; N, 8.91. Found: C, 76.45; H, 5.17; N, 9.20.

The ultraviolet absorption spectrum of the compound (in dimethylformamide-ethanol) exhibited maxima at sh 268, 279, 295, 346, and 403 millimicrons.

The infrared absorption spectrum of the compound (mineral oil mull) showed: =CH 3040; C=O 1640; C=C 1615, 1575, 1545, 1502, and 1495 cm.$^{-1}$.

EXAMPLE 2

5,11-Diethylindolo[3,2-b]Carbazole-6,12(5H,11H)-Dione

Following the procedure of Example 1, but substituting 1-ethyl-2-indolecarbonyl chloride for 1-methyl-2-indolecarbonyl chloride, there was obtained 5,11-diethylindolo-[3,2-b]carbazole-6,12(5H,11H)-dione.

EXAMPLE 3

5,11-Diisopropylindolo[3,2-b]Carbazole-6,12(5H,11H)-Dione

Following the procedure of Example 1, but substituing 1-isopropyl-2-indolecarbonyl chloride for 1-methyl-2-indolecarbonyl chloride, there was obtained 5,11-diisopropylindolo[3,2-b]carbazole-6,12(5H,11H)-dione.

EXAMPLE 4

5,11-Di-Sec.Butylindolo[3,2-b]Carbazole-6,12(5H,11H)-Dione

Following the procedure of Example 1, but substituting 1-sec.butyl-2-indolecarbonyl chloride for 1-methyl-2-indolecarbonyl chloride, there was obtained 5,11-di-sec.butylindolo[3,2-b]carbazole-6,12(5H,11H)-dione.

EXAMPLE 5

Following the procedure of Example 1, but increasing the amount of aluminum chloride to 0.06 mole and the amount of ethylene dichloride to 40 ml., and also including 0.015 mole of 1-ethyl-2-indolecarbonyl chloride in the reaction mixture, there was obtained a mixture consisting of 5,11-dimethylindolo[3,2-b]carbazole-6,12(5H,11H)-dione, 5,11-diethlindolo[3,2-b]carbazole-6,12(5H,11H)-dione, and 5-ethyl-11-methylindolo[3,2-b]carbazole-6,12(5H,11H)-dione. This mixture can be separated into the individual components by means of fractional crystallization from dimethylformamide.

I claim:
1. A compound of the formula:

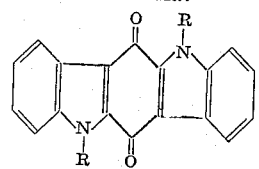

wherein R is alkyl of 1 to 4 carbon atoms, inclusive.

2. 5,11 - dimethylindolo[3,2-b]carbazole - 6,12(5H,11H)-dione.

3. A process for preparing a compound of the formula:

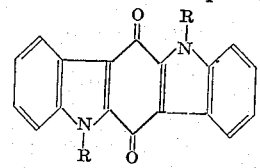

wherein R is alkyl, which comprises mixing a Friedel-Crafts catalyst and an acid halide of the formula:

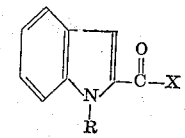

wherein R is as given above and X is halogen having an atomic number from 17 to 35.

4. The process of claim 3 in which the acid halide is an acid chloride.

5. The process of claim 4 in which the catalyst is aluminum chloride.

6. A process for preparing 5,11-dimethylindolo[3,2-b]-carbazole-6,12(5H,11H)-dione which comprises mixing 1-methyl-2-indolecarbonyl chloride and aluminum chloride in the presence of an inert solvent.

No references cited.